United States Patent
Rodrigues et al.

(10) Patent No.: US 11,536,947 B2
(45) Date of Patent: Dec. 27, 2022

(54) TUNABLE WINDOW SYSTEM FOR A VEHICLE

(71) Applicant: Toyota Motor Engineering & Manufacturing North America, Inc, Plano, TX (US)

(72) Inventors: Sean P. Rodrigues, Ann Arbor, MI (US); Chungchih Chou, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 73 days.

(21) Appl. No.: 17/228,230

(22) Filed: Apr. 12, 2021

(65) Prior Publication Data
US 2022/0326507 A1    Oct. 13, 2022

(51) Int. Cl.
*G02B 26/02*    (2006.01)
*B60R 1/08*     (2006.01)
*B60J 3/04*     (2006.01)
*G02B 1/00*     (2006.01)

(52) U.S. Cl.
CPC ............ *G02B 26/023* (2013.01); *B60J 3/04* (2013.01); *B60R 1/088* (2013.01); *G02B 1/002* (2013.01)

(58) Field of Classification Search
CPC .......... G02B 26/023; G02B 1/002; B60J 3/04; B60R 1/088
See application file for complete search history.

(56) References Cited

U.S. PATENT DOCUMENTS

| | | | |
|---|---|---|---|
| 5,076,673 A | * | 12/1991 | Lynam .................... G02F 1/153 359/275 |
| 10,520,780 B2 | | 12/2019 | Port et al. |
| 2015/0205021 A1 | | 7/2015 | Howell et al. |
| 2019/0146082 A1 | | 5/2019 | Cohen et al. |

FOREIGN PATENT DOCUMENTS

| FR | 3031399 B1 | 1/2017 |
|---|---|---|
| WO | 2018022466 A2 | 2/2018 |

OTHER PUBLICATIONS

She et al., "Adaptive metalenses with simultaneous electrical control of focal length, astigmatism, and shift," Science Advances, vol. 4, No. 2, Feb. 23, 2021, 8 pages.

* cited by examiner

*Primary Examiner* — James C. Jones
(74) *Attorney, Agent, or Firm* — Jordan IP Law, LLC

(57) ABSTRACT

Systems and methods provide technology for a tunable vehicle window system to adjust a view for a window. The technology includes a window assembly comprising a tunable optical metamaterial deployed on a surface of a window, the tunable optical metamaterial including a transparent electroactive substrate having disposed thereon an optically active particle array, the optically active particle array including resonators having elongated members arranged in two or more orientations. The technology includes a controller to receive a signal from a photosensor indicative of a condition of incoming light to the vehicle, determine a change in a view for the window assembly based on the received photosensor signal, and control a voltage applied to the substrate to selectively expand or contract the substrate within a plane substantially parallel to the window surface and in a manner to adjust the view for the window assembly according to the determined view change.

20 Claims, 8 Drawing Sheets

TUNABLE WINDOW SYSTEM FOR A VEHICLE

TECHNICAL FIELD

Embodiments generally relate to vehicle window systems. More particularly, embodiments relate to a tunable vehicle window system to adjust a view for one or more windows.

BACKGROUND

Vehicle driving conditions can result in difficulties or limitations in visibility such as glare caused by sunshine or headlights of other vehicles, excess or reduced ambient lighting, rapid changes in lighting, etc. Current approaches fail to provide a comprehensive solution to such visibility problems.

BRIEF SUMMARY

In some embodiments, a tunable window system for a vehicle may include a window assembly including a tunable optical metamaterial deployed on a surface of a window, the tunable optical metamaterial including a transparent electroactive substrate having disposed thereon an optically active particle array, the optically active particle array including resonators having elongated members arranged in two or more orientations, a photosensor, and a controller, the controller configured to receive a signal from the photosensor indicative of a condition of incoming light to the vehicle, determine a change in a view for the window assembly based on the received photosensor signal; and control a voltage applied to the substrate to selectively expand or contract the substrate within a plane substantially parallel to the window surface and in a manner to adjust the view for the window assembly according to the determined view change, wherein the optically active particle array is optically responsive to the selective expansion or contraction of the substrate.

In some embodiments, at least one non-transitory computer readable storage medium may include a set of instructions which, when executed by a processor, cause the processor to receive a signal from a photosensor indicative of a condition of incoming light to a vehicle, determine a change in a view for a window assembly based on the received photosensor signal, wherein the window assembly includes a tunable optical metamaterial deployed on a surface of a window, the tunable optical metamaterial including a transparent electroactive substrate having disposed thereon an optically active particle array, the optically active particle array including resonators having elongated members arranged in two or more orientations, and control a voltage applied to the substrate to selectively expand or contract the substrate within a plane substantially parallel to the window surface and in a manner to adjust the view for the window assembly according to the determined view change, wherein the optically active particle array is optically responsive to the selective expansion or contraction of the substrate.

In some embodiments, a method may include receiving a signal from a photosensor indicative of a condition of incoming light to a vehicle, determining a change in a view for a window assembly based on the received photosensor signal, wherein the window assembly includes a tunable optical metamaterial deployed on a surface of a window, the tunable optical metamaterial including a transparent electroactive substrate having disposed thereon an optically active particle array, the optically active particle array including resonators having elongated members arranged in two or more orientations, and controlling a voltage applied to the substrate to selectively expand or contract the substrate within a plane substantially parallel to the window surface and in a manner to adjust the view for the window assembly according to the determined view change, wherein the optically active particle array is optically responsive to the selective expansion or contraction of the substrate.

BRIEF DESCRIPTION OF THE SEVERAL VIEWS OF THE DRAWINGS

The various advantages of the embodiments of the present disclosure will become apparent to one skilled in the art by reading the following specification and appended claims, and by referencing the following drawings, in which:

DETAILED DESCRIPTION

Figure 1A:
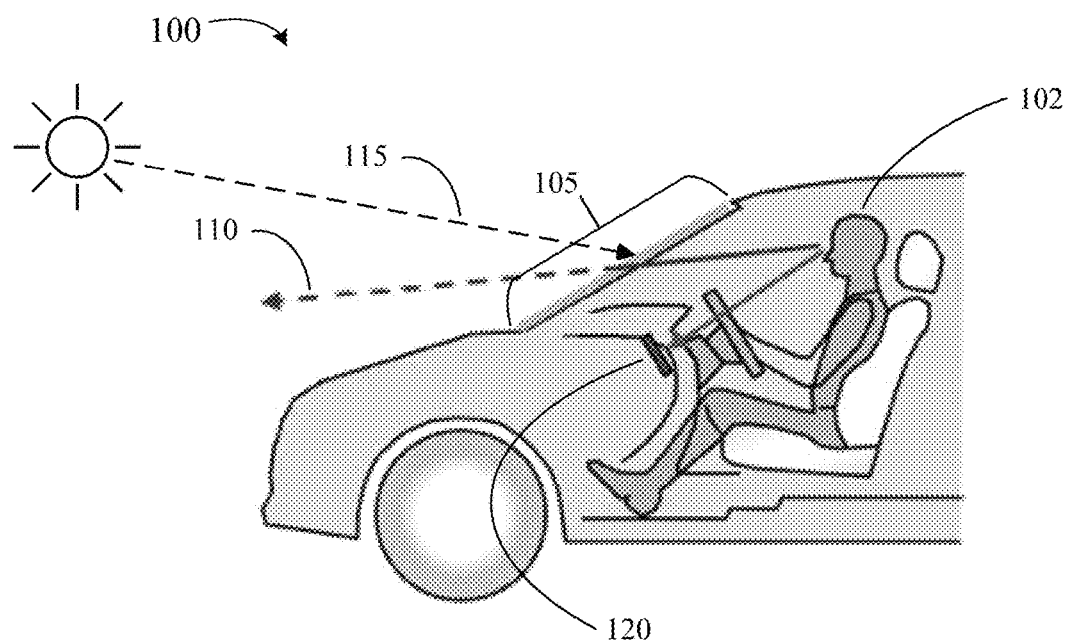
FIGS. 1A-1B are diagrams illustrating an example of a vehicle in which a tunable window system may be employed, according to one or more embodiments.

FIG. 1A is a diagram illustrating an example of a vehicle in which a tunable window system may be employed according to one or more embodiments, with reference to components and features described herein including but not limited to the figures and associated description. Illustrated in FIG. 1A is a side view of a portion of a vehicle 100 showing a driver 102 situated within the vehicle 100. The vehicle 100 includes a front window 105 (also known as a windshield) through which the driver and any passengers may view the environment surrounding the vehicle, such as provided by a viewpoint 110, which may include items such as the road or street, other vehicles, traffic signals, signs, landscape/buildings, etc. Incoming light such as, e.g., light rays 115 from the sun may provide lighting for the environment, but may also contribute to visibility limitations through glare, excessive intensity (e.g., brightness), and/or shadows in some cases. In other cases, incoming light may be dim and limit the ability to see the vehicle environment. The vehicle 100 may also include a display 120 to provide the driver with information, but in some conditions the ambient lighting in the vehicle may present visibility limitations for the display such as, e.g., overly bright display, dim display, glare, etc. The vehicle 100 may also include one or more mirrors (not shown in FIG. 1) to assist a driver, but some lighting conditions may present visibility limitations for seeing items reflected in the mirrors. In accordance with the disclosed technology herein, a tunable window system may address these and other visibility limitations by tuning (i.e., adjusting) a window assembly comprising a tunable optical metamaterial deployed on a surface of the window or display to change the view provided by the window or display and thereby reduce or eliminate the visibility problem.

Figure 1B:
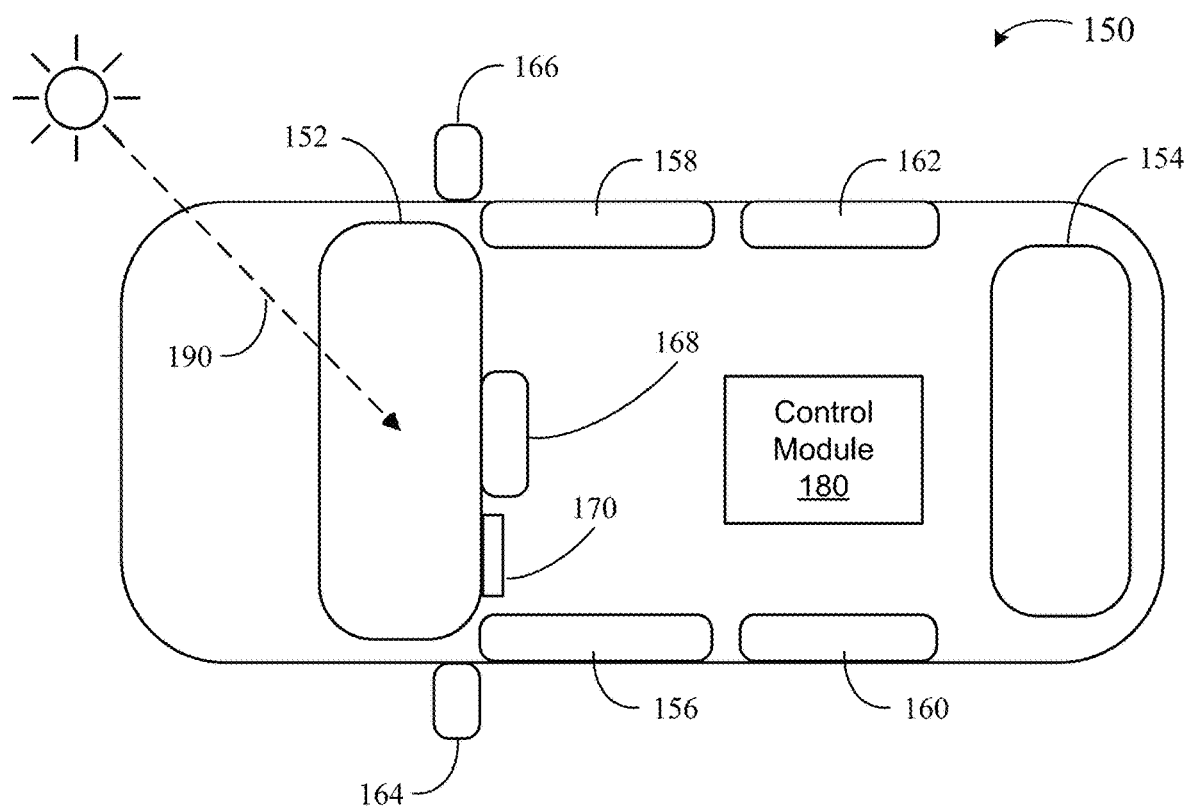

FIG. 1B is a diagram illustrating an example of a vehicle in which a tunable window system may be employed according to one or more embodiments, with reference to components and features described herein including but not limited to the figures and associated description. FIG. 1B illustrates a top view of a vehicle 150. A tunable window system may be implemented in the vehicle 150 via a series of window, mirror and/or display assemblies to address limitations in visibility. For example, the vehicle 150 with a tunable window system may include a front window (i.e., windshield) assembly 152, a rear window assembly 154, left side window assemblies 156 and 160, right side window assemblies 158 and 162, a left side mirror assembly 164, a right side mirror assembly 166, a rear view mirror assembly 168, and/or a display assembly 170. Each window assembly, mirror assembly and/or display assembly may include a tunable optical metamaterial deployed on a surface of any one or more of the respective windows, mirrors or display. The tunable window system may also include a control module 180 (i.e., controller) to control the tuning for each window assembly, mirror assembly and/or display assembly. Incoming light such as, e.g., light rays 190 from the sun may provide lighting for the environment, but may also contribute to a variety of visibility limitations through glare, excessive intensity (e.g., brightness), and/or shadows; in some cases, different windows or mirrors may concurrently present different visibility limitations. In accordance with the disclosed technology herein, a tunable window system may address these and other visibility limitations by tuning (i.e., adjusting) any one or more of the window, mirror and/or display assemblies to change the view provided by the window, mirror or display and thereby reduce or eliminate the visibility problem.

Figure 2:
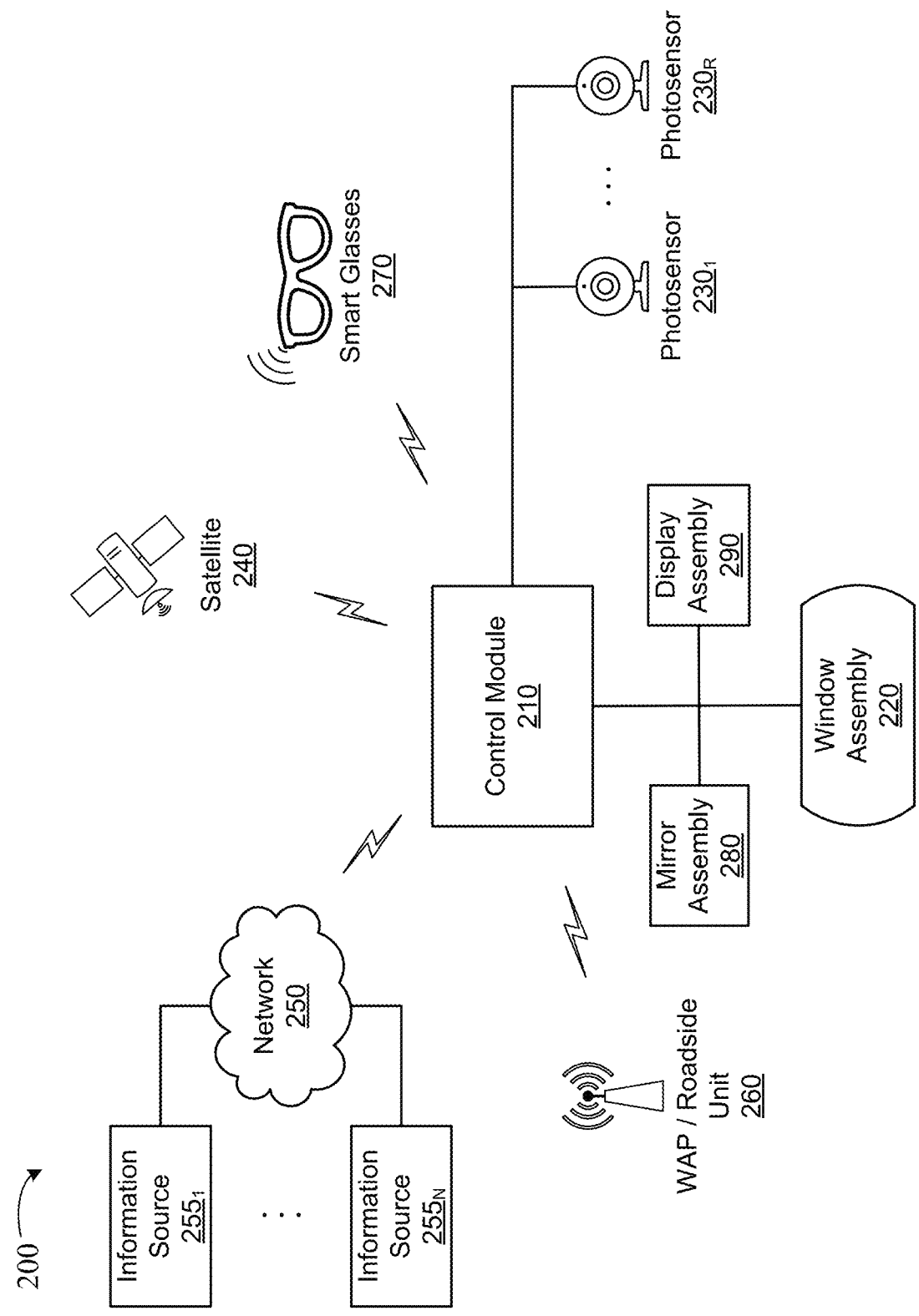
FIG. 2 is a diagram illustrating an example of a tunable window system for a vehicle according to one or more embodiments.

FIG. 2 is a diagram illustrating an example of a tunable window system 200 for a vehicle according to one or more embodiments, with reference to components and features described herein including but not limited to the figures and associated description. The vehicle may correspond to vehicle 100 (FIG. 1A, already discussed) and/or to vehicle 150 (FIG. 1B, already discussed). The system 200 may include a control module (i.e., controller) 210, one or more window assemblies 220, and one or more photosensors $230_i$ (e.g., shown as $230_1 \ldots 230_R$). The system 200 (e.g., via control module 210) may be configured to receive data such as, e.g., data from one or more satellites 240, data via a wireless network 250 from one or more information sources $255_i$ (e.g., shown as $255_1 \ldots 255_N$), data from a Wireless Access Point (WAP) unit or roadside unit 260, and/or data from a smart glasses device 270. The incoming data may include one or more types or categories of data, such as, e.g., geolocation data, weather data, date data, time of day data, or other data pertinent to the vehicle and/or its environment. The geolocation data may include Global Positioning System (GPS) data. The system may also include one or more mirror assemblies 280 and/or one or more display assemblies 290.

The controller 210 may include a processor and may be configured for data communication (such as, e.g., via a connection) with the other components of system 200. The controller 210 may communicate, send or receive messages, commands, requests, notifications, data, etc. to/from other devices in system 100, including the one or more window assemblies 220, the one or more mirror assemblies 280, and the one or more display assemblies 290. The controller 210 may correspond to control module 180 (FIG. 1B, already discussed). Further details regarding an example of a controller 210 are provided with reference to FIG. 3 herein.

Each of the window assemblies 220 may include a tunable optical metamaterial deployed on a surface of a window. For example, the tunable optical metamaterial may be deployed on an interior surface (i.e., on a surface in the interior of the vehicle) of any window in a vehicle. The tunable optical metamaterial may include a transparent electroactive substrate having disposed thereon an optically active particle array. The electroactive substrate may include an electroactive polymer (EAP). The electroactive substrate may be configured to expand or contract within a plane substantially parallel to the window surface upon application of a voltage. A window assembly 220 may correspond to any one of the window assemblies 152, 154, 156, 158, 160 or 162 (FIG. 1B, already discussed). Each of the window assemblies 220 may be coupled to or otherwise in data communication with the controller 210 via wireless or wired connections. Further details regarding an example of a window assembly 220 with tunable optical metamaterial are provided with reference to FIG. 4A, FIGS. 5A-5B and FIGS. 6A-6C herein.

Each photosensor $230_i$ may be a photosensor arranged to collect or sample incoming light and provide output signals indicative of a character or property of the incoming light (such as, e.g., intensity, hue, etc.). The photosensors $230_i$ may be dispersed or placed within the vehicle in a manner to provide information sufficient about the incoming light to enable tuning of the various window assemblies. For example, each window assembly may be accompanied by one or more photosensors, and/or the photosensors may be integrated into each window assembly. The photosensors $230_i$ may be sensitive to one or more frequency bands of light, such as, e.g., a red band, a blue band, a green band, an infrared band, an ultraviolet band, etc. In some embodiments, each photosensor $230_i$ may include an array of photosensors (such as, e.g., a camera). Each photosensor $230_i$ may be coupled to or otherwise in data communication with the controller 210 via wireless or wired connections.

The smart glasses device 270 may comprise a wearable device such as, e.g., Google Glass, to provide data reflecting the incoming light conditions of a driver or passenger in the vehicle. For example, the smart glasses device 270 may have a photo sensor that provides data to the controller 210. The data may be provided wirelessly, e.g., through the cloud (such as, e.g., network 250) or via Bluetooth connection. The smart glasses may provide information such as, e.g., the angle of the light relative to the driver. Such information can be used to determine how to adjust the incoming light—such as, for example, modification of the resonant polarization of the tunable optical metamaterial in one or more of the window assemblies 220.

Each mirror assembly 280 may include a tunable optical metamaterial deployed on a surface of a mirror. For example, the tunable optical metamaterial may be deployed on a front surface (i.e., the viewable surface) of any mirror in a vehicle. The tunable optical metamaterial may include a transparent electroactive substrate having disposed thereon an optically active particle array. The electroactive substrate may include an electroactive polymer (EAP). The electroactive substrate may be configured to expand or contract within a plane substantially parallel to the mirror surface upon application of a voltage. A mirror assembly 280 may correspond to any one of the mirror assemblies 164, 166 or 168 (FIG. 1B, already discussed). Each mirror assembly 280 may be coupled to or otherwise in data communication with the controller 210 via wireless or wired connections. Further details regarding an example of a mirror assembly 280 with tunable optical metamaterial are provided with reference to FIG. 4B, FIGS. 5A-5B and FIGS. 6A-6C herein.

Each display assembly 290 may include a tunable optical metamaterial deployed on a surface of a display. For example, the tunable optical metamaterial may be deployed on a front surface (i.e., the viewable surface) of any display in a vehicle. The tunable optical metamaterial may include a transparent electroactive substrate having disposed thereon an optically active particle array. The electroactive substrate may include an electroactive polymer (EAP). The electroactive substrate may be configured to expand or contract within a plane substantially parallel to the display surface upon application of a voltage. A display assembly 290 may correspond to the display assembly 170 (FIG. 1B, already discussed). Each display assembly 290 may be coupled to or otherwise in data communication with the controller 210 via wireless or wired connections. Further details regarding an example of a display assembly 290 with tunable optical metamaterial are provided with reference to FIG. 4C, FIGS. 5A-5B and FIGS. 6A-6C herein.

The wireless network 250 may include any combination of wireless network and wired network elements, and may be configured to connect to the information sources $255_1$ . . . $255_N$. For example, the network 250 may include one or more of a cable network, a satellite network, a wireless local area network (LAN), a cellular communications network (such as, e.g., Global System for Mobile Communication, Time Division Multiplexing based systems, Code Division Multiple Access based systems), Wi-Fi, Fixed Wireless Data, any network operating under one or more IEEE 802.11 protocols (including, e.g., IEEE 802.11b, 802.11n, 802.11g, 802.11ac, 802.11ax, and/or 802.11ay), 802.15.1, Bluetooth, NFC, Radio Frequency Identification (RFID), and/or the like. The wireless network 250 may connect to or form a part of a global network (such as the Internet).

Figure 3:
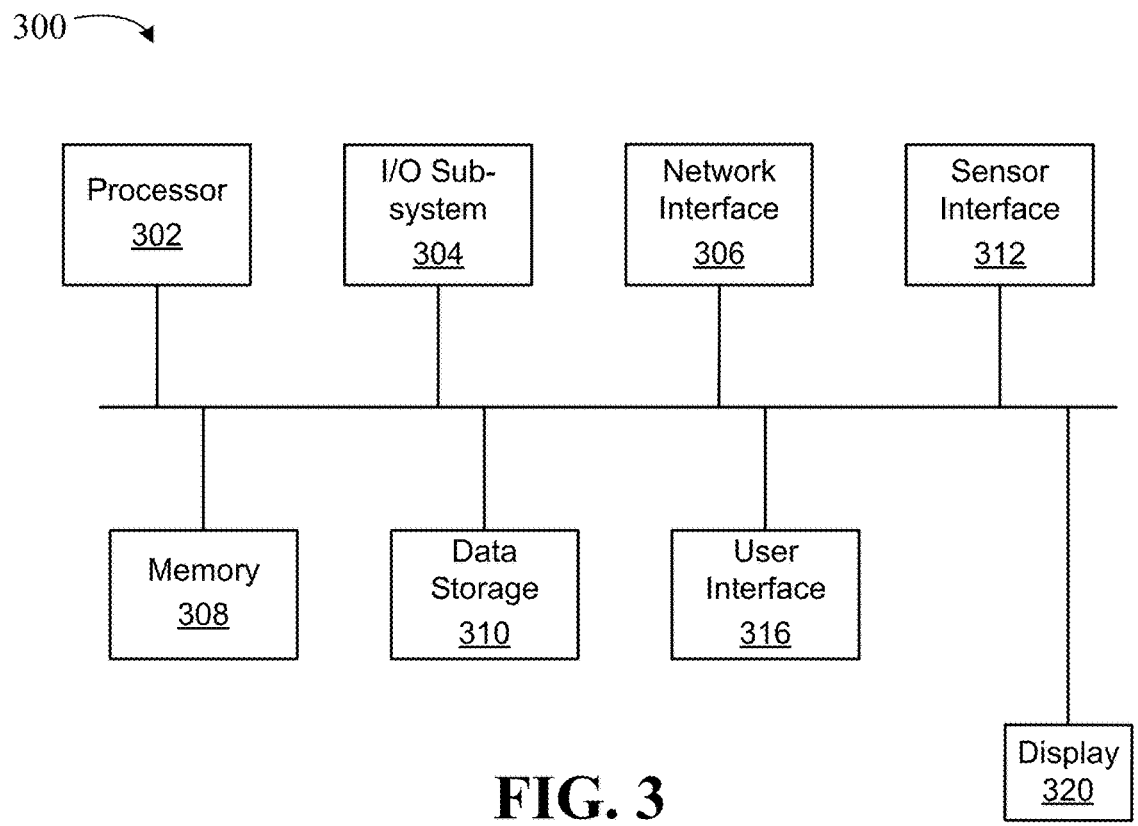
FIG. 3 is a diagram illustrating an example of a controller for a tunable window system according to one or more embodiments.

FIG. 3 is a diagram illustrating an example of a controller 300 for a tunable window system according to one or more embodiments, with reference to components and features described herein including but not limited to the figures and associated description. The controller 300 may correspond to the control module 180 (FIG. 1B, already discussed) and/or the control module 210 (FIG. 2, already discussed). Although FIG. 3 illustrates certain components, the controller 300 may include additional or multiple components connected in various ways. It is understood that not all embodiments may necessarily include every component shown in FIG. 3. The controller 300 may include one or more processors 302. The controller 300 may also include an I/O subsystem 304, a network interface 306, a memory 308, a data storage 310, a sensor interface 312, and/or a user interface 316. The controller 300 may also include a display 320. In some embodiments, the controller 300 may interface with a separate display such as, e.g., a display installed as original equipment in the vehicle.

The processor 302 may include one or more processing devices such as a microprocessor, a fixed application-specific integrated circuit (ASIC) processor, a reduced instruction set computing (RISC) processor, a complex instruction set computing (CISC) processor, a field-programmable gate array (FPGA), etc., along with associated circuitry, logic, and/or interfaces. The processor 302 may include, or be connected to, a memory (such as, e.g., the memory 308) storing executable instructions and/or data, as may be necessary or appropriate. The processor 302 may execute such instructions to implement, control, operate or interface with any devices or features of the system 200 and/or any of the devices or methods described herein with reference to FIGS. 2, 3, 4A-4C, 5A-5B, 6A-6C, 7 and/or 8. The processor 302 may communicate, send, or receive messages, requests, notifications, data, etc. to/from other devices, such as the devices illustrated in FIG. 2. The processor 302 may be embodied as any type of processor capable of performing the functions described herein. For example, the processor 302 may be embodied as a single or multi-core processor(s), a digital signal processor, a microcontroller, or other processor or processing/controlling circuit.

The I/O subsystem 304 may include circuitry and/or components suitable to facilitate input/output operations with the processor 302, the memory 308, and other components of the controller 300.

The network interface 306 may include suitable logic, circuitry, and/or interfaces that transmits and receives data over one or more communication networks using one or more communication network protocols. The network interface 306 may operate under the control of the processor 302, and may transmit/receive various requests and messages to/from one or more other devices (such as, e.g., any one or more of the devices illustrated in FIG. 2). The network interface 306 may include wired or wireless data communication capability; these capabilities may support data communication with a wired or wireless communication network, such as wireless network 250 (FIG. 2, already discussed), and further including the Internet, a wide area network (WAN), a local area network (LAN), a wireless personal area network, a wide body area network, a cellular network, a telephone network, any other wired or wireless network for transmitting and receiving a data signal, or any combination thereof (including, e.g., a Wi-Fi network or corporate LAN). The network interface 306 may support communication with one or more satellites and/or one or more WAP/roadside units. The network interface 306 may support communication via a short-range wireless communication field, such as Bluetooth, NFC, or RFID. Examples of network interface 306 may include, but are not limited to, an antenna, a radio frequency transceiver, a wireless transceiver, a Bluetooth transceiver, an ethernet port, a universal serial bus (USB) port, or any other device configured to transmit and receive data.

The memory 308 may include suitable logic, circuitry, and/or interfaces to store executable instructions and/or data, as may be necessary or appropriate, when executed, to implement, control, operate or interface with any devices or features of the system 200 and/or any of the devices or methods described herein with reference to FIGS. 2, 3, 4A-4C, 5A-5B, 6A-6C, 7 and/or 8. The memory 308 may be embodied as any type of volatile or non-volatile memory or data storage capable of performing the functions described herein, and may include a random-access memory (RAM), a read-only memory (ROM), write-once read-multiple memory (e.g., EEPROM), a removable storage drive, a hard disk drive (HDD), a flash memory, a solid-state memory, and the like, and including any combination thereof. In operation, the memory 308 may store various data and software used during operation of the controller 300 such as operating systems, applications, programs, libraries, and drivers. The memory 308 may be communicatively coupled to the processor 302 directly or via the I/O subsystem 304.

The data storage 310 may include any type of device or devices configured for short-term or long-term storage of data such as, for example, memory devices and circuits, memory cards, hard disk drives, solid-state drives, non-volatile flash memory, or other data storage devices. The data storage 310 may include or be configured as a database, such as a relational or non-relational database, or a combination of more than one database. In some embodiments, a database or other data storage may be physically separate and/or remote from the controller 300, and/or may be located in another computing device, a database server, on a cloud-based platform, or in any storage device that is in data communication with the controller 300.

The sensor interface 312 may include circuitry and/or components suitable to facilitate communications and/or exchange of data, commands or signals between the controller 300 and one or more sensors, which may include one or more of the photosensors $230_i$ (FIG. 2, already discussed).

The user interface 316 may include code to present, on a display, information or screens for a user (e.g., a vehicle driver) and to receive input (including commands) from a user via an input device (e.g., a touch-screen device).

The display 320 may be any type of device for presenting visual information, such as a computer monitor, a flat panel display, or a mobile device screen, and may include a liquid crystal display (LCD), a light-emitting diode (LED) display, a plasma panel, or a cathode ray tube display, etc. The display 320 may include a display interface for communicating with the display. In some embodiments, display 320 may include a display interface for communicating with a display external to the controller 300 (such as, e.g., a separate display installed as original equipment in the vehicle).

In some embodiments, one or more of the illustrative components of the controller 300 may be incorporated (in whole or in part) within, or otherwise form a portion of, another component. For example, the memory 304, or portions thereof, may be incorporated within the processor 302. As another example, the user interface 316 may be incorporated within the processor 302 and/or code in the memory 308. In some embodiments, the controller 300 may be embodied as, without limitation, a mobile computing device, a smartphone, a wearable computing device, an Internet-of-Things device, a laptop computer, a tablet computer, a notebook computer, a computer, a workstation, a server, a multiprocessor system, and/or a consumer electronic device.

Figures 4A, 4B, 4C:
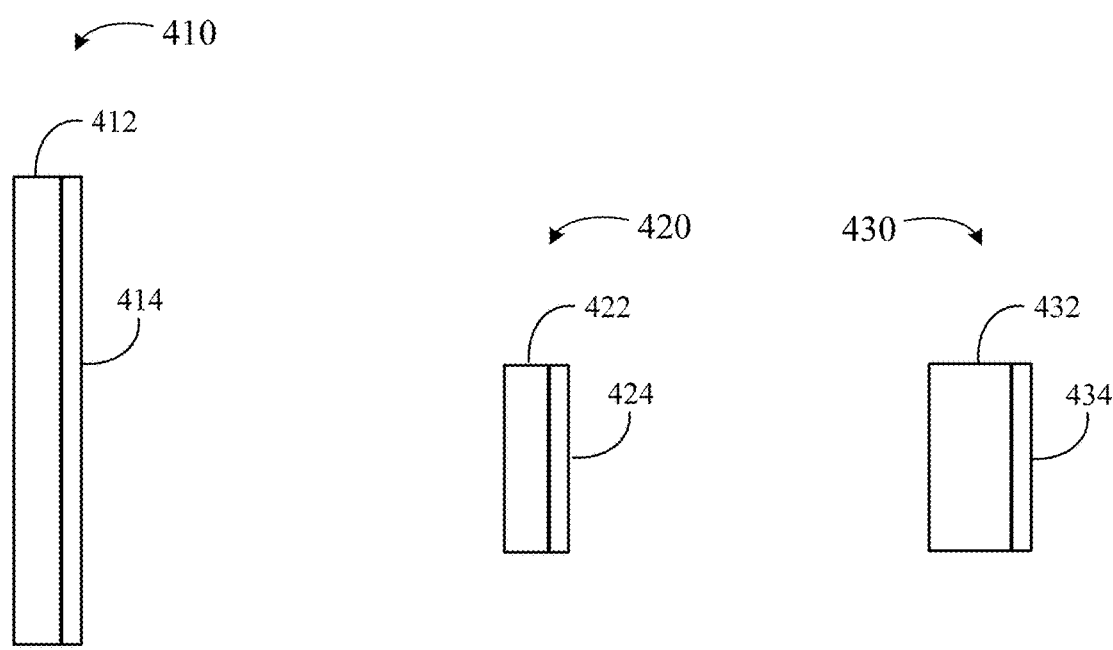
FIGS. 4A-4C provide diagrams illustrating examples of window, display and mirror assemblies for use in a tunable window system according to one or more embodiments.

FIG. 4A is a diagram illustrating an example of a window assembly 410 for use in a tunable window system according to one or more embodiments, with reference to components and features described herein including but not limited to the figures and associated description. The window assembly 410 may include a window 412 and a tunable optical metamaterial 414. One or more window assemblies 410 may be included in a tunable window system. The window 412 may correspond to any of the windows (such as, e.g., front window 152) identified in FIGS. 1A and/or 1B (already discussed), and may include any material suitable for a vehicle window. The tunable optical metamaterial 414 may be deployed, for example, on an interior surface of a window, and may conform to the shape of the window surface (e.g., any curvature of the window surface). The tunable optical metamaterial 414 may include a transparent electroactive substrate having disposed thereon an optically active particle array. The electroactive substrate may include an electroactive polymer (EAP). The electroactive substrate may be configured to expand or contract within a plane substantially parallel to the window surface upon application of a voltage. Further details of the tunable optical metamaterial 414 are provided with reference to FIGS. 5A-5B and FIGS. 6A-6C herein.

FIG. 4B is a diagram illustrating an example of a mirror assembly 420 for use in a tunable window system according to one or more embodiments, with reference to components and features described herein including but not limited to the figures and associated description. The mirror assembly 420 may include a mirror 422 and a tunable optical metamaterial 424. One or more mirror assemblies 420 may be included in a tunable window system. The mirror 422 may correspond to any of the mirrors (such as, e.g., mirror 164) identified in FIG. 1B (already discussed), and may include any material suitable for a vehicle mirror. The tunable optical metamaterial 424 may be deployed, for example, on an outer surface of a mirror, and may conform to the shape of the mirror surface (e.g., any curvature of the mirror surface). The tunable optical metamaterial 424 may include a transparent electroactive substrate having disposed thereon an optically active particle array. The electroactive substrate may include an electroactive polymer (EAP). The electroactive substrate may be configured to expand or contract within a plane substantially parallel to the mirror surface upon application of a voltage. Further details of the tunable optical metamaterial 424 are provided with reference to FIGS. 5A-5B and FIGS. 6A-6C herein.

FIG. 4C is a diagram illustrating an example of a display assembly 430 for use in a tunable window system according to one or more embodiments, with reference to components and features described herein including but not limited to the figures and associated description. The display assembly 430 may include a display 432 and a tunable optical metamaterial 434. One or more display assemblies 430 may be included in a tunable window system. The display 432 may correspond to any display (such as, e.g., display 170) identified in FIGS. 1A and/or 1B (already discussed). The tunable optical metamaterial 434 may be deployed, for example, on an outer surface of a display, and may conform to the shape of the display surface (e.g., any curvature of the display surface). The tunable optical metamaterial 434 may include a transparent electroactive substrate having disposed thereon an optically active particle array. The electroactive substrate may include an electroactive polymer (EAP). The electroactive substrate may be configured to expand or contract within a plane substantially parallel to the display surface upon application of a voltage. Further details of the tunable optical metamaterial 434 are provided with reference to FIGS. 5A-5B and FIGS. 6A-6C herein.

Figure 4D:
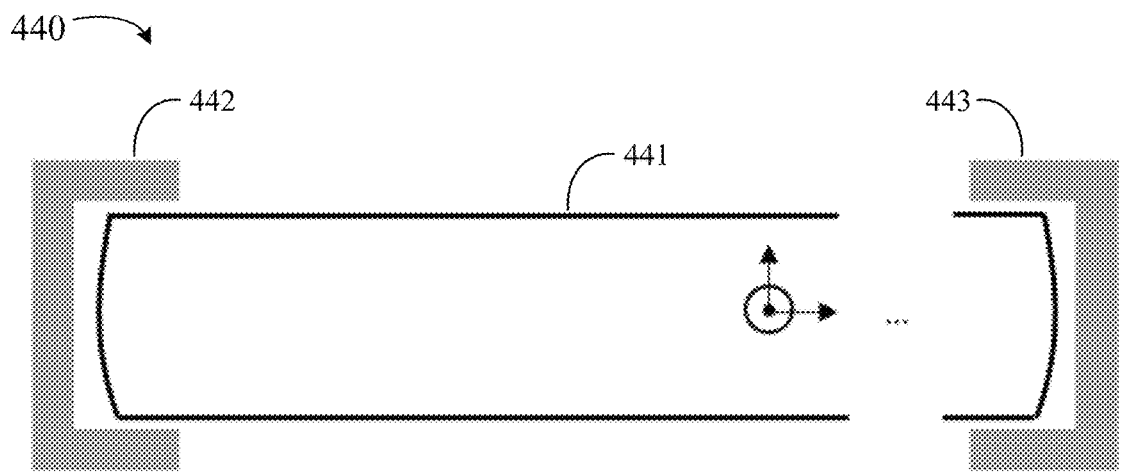
FIGS. 4D-4F provide diagrams illustrating examples of techniques for mounting a tunable optical metamaterial for use in a tunable window system according to one or more embodiments.

FIG. 4D provides a diagram illustrating an example configuration 440 for mounting a tunable optical metamaterial for use in a tunable window system according to one or more embodiments, with reference to components and features described herein including but not limited to the figures and associated description. As shown in FIG. 4D, a tunable optical metamaterial 441 may be captured between a pair of flanges 442 and 443 that hold the metamaterial 441 in place. The tunable optical metamaterial 441 may expand in one or more of an x-direction and/or a y-direction, depending upon the relative position and spacing between the metamaterial 441 and the flanges 442 and 443. For example, in mounting the flanges to minimize unwanted jostling or movement of the metamaterial, the amount of stretching may be limited or constrained in a direction. In some examples, the tunable optical metamaterial 441 may be configured to stretch or contract by an amount measured in nanometers (nm) or micrometers (μm), which may result in little to no impact due to positioning between the metamaterial and the flanges. The flanges 442 and 443 may be attached to a window, mirror or display to form a respective window assembly (such as window assembly 410 in FIG. 4A, already discussed), mirror assembly (such as mirror assembly 420 in FIG. 4B, already discussed), or display assembly (such as display assembly 430 in FIG. 4C, already discussed). Various mounting configurations using flanges are possible, including use of flanges along the sides of the metamaterial and/or along the top and/or bottom of the metamaterial.

Figure 4E:
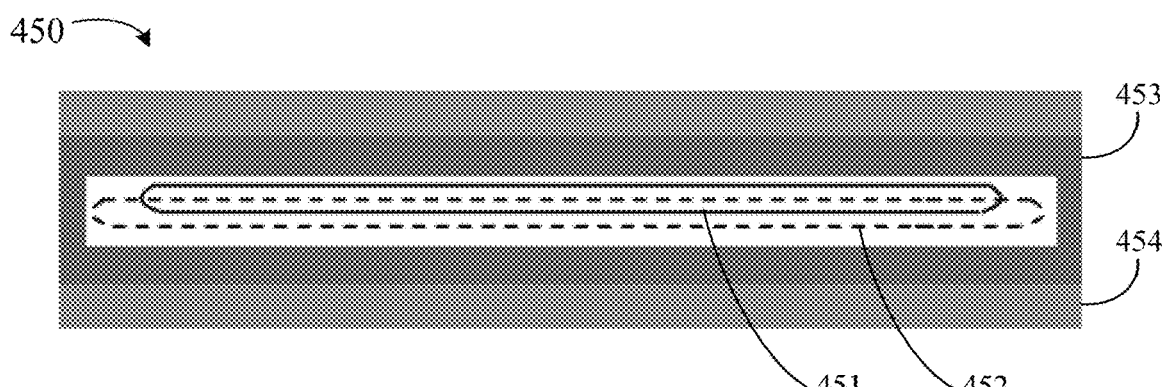

FIG. 4E provides a diagram illustrating another example configuration 450 for mounting a tunable optical metamaterial for use in a tunable window system according to one or more embodiments, with reference to components and features described herein including but not limited to the figures and associated description. As shown in FIG. 4E, a tunable optical metamaterial shown in a first position and state 451 (solid outline) may be encapsulated within a transparent enclosure 453. The transparent enclosure 453 may provide a relatively loose fitting around the metamaterial, thus providing room for movement as well as expansion of the metamaterial. As illustrated in the example of FIG. 4E, the enclosure 453 may permit the tunable optical metamaterial to occupy a second position and state 452 (dotted outline), which may be, e.g., an expanded state relative to first position and state 451. The transparent enclosure 453 may be formed from plastics such as PET (polyethylene terephthalate), PVC (polyvinyl chloride), PP (polypropylene), PS (polystyrene), PC (polycarbonate), PMMA (polymethyl methacrylate), etc. In some embodiments, the transparent enclosure 453 may be formed from two panes of glass, or formed from a hybrid of glass and plastic (such as, e.g., attaching the plastic enclosure to a glass pane). In one or more embodiments, the configuration 450 may include a transparent coating 454 covering all or a portion of the transparent enclosure 453.

Figure 4F:
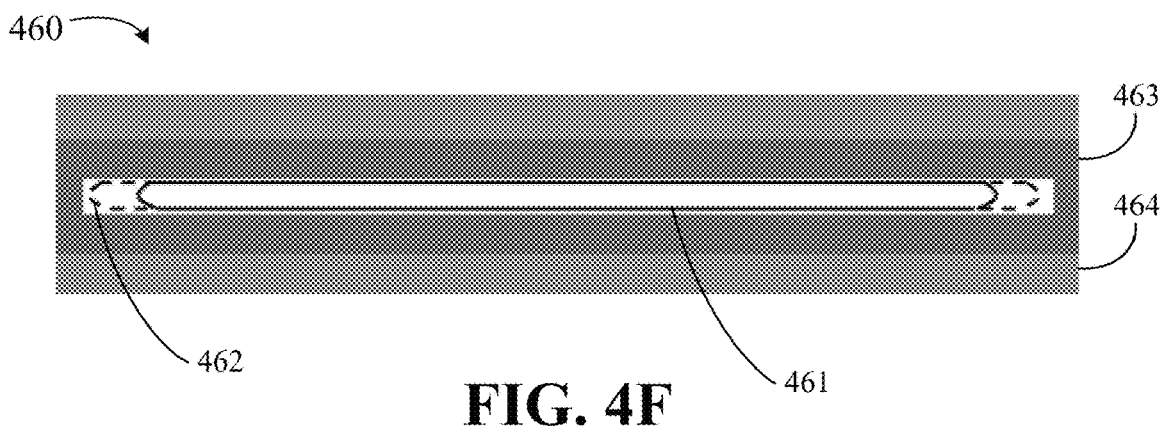

FIG. 4F provides a diagram illustrating another example configuration 460 for mounting a tunable optical metamaterial for use in a tunable window system according to one or more embodiments, with reference to components and features described herein including but not limited to the figures and associated description. The configuration 460 illustrated in FIG. 4F is an alternative embodiment to the configuration 450 illustrated in FIG. 4E. As shown in FIG. 4F, a tunable optical metamaterial shown in a first position and state 461 (solid outline) may be encapsulated within a transparent enclosure 463. The transparent enclosure 463 may provide a relatively fitted arrangement around the metamaterial, thus providing room for expansion of the metamaterial, but otherwise providing little, if any, room for other movement of the metamaterial. As illustrated in the example of FIG. 4F, the enclosure 463 may permit the tunable optical metamaterial to occupy a second position and state 462 (dotted outline), which may be, e.g., an expanded state relative to first position and state 461. The transparent enclosure 463 may be formed from plastics such as PET (polyethylene terephthalate), PVC (polyvinyl chloride), PP (polypropylene), PS (polystyrene), PC (polycarbonate), PMMA (polymethyl methacrylate), etc. In some embodiments, the transparent enclosure 463 may be formed from two panes of glass, or formed from a hybrid of glass and plastic (such as, e.g., attaching the plastic enclosure to a glass pane). In one or more embodiments, the configuration 460 may include a transparent coating 464 covering all or a portion of the transparent enclosure 463.

Figure 5A:
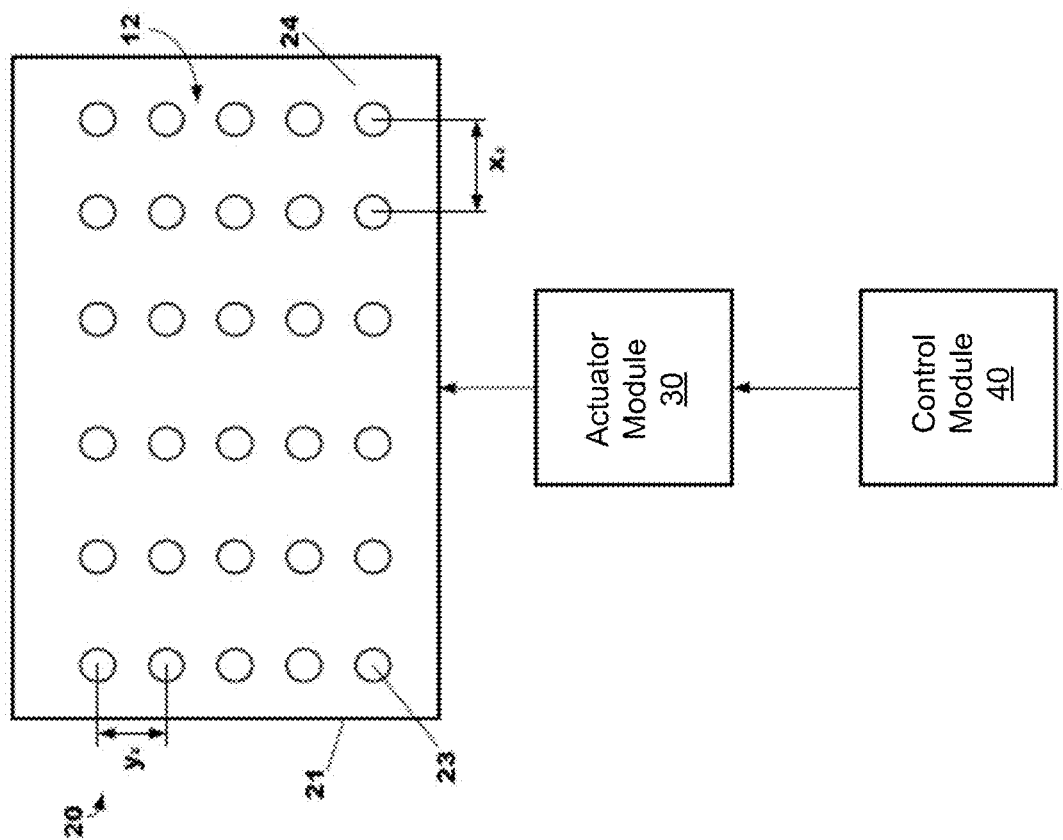
FIGS. 5A-5B provide diagrams illustrating an example of a tunable optical metamaterial for use in a tunable window system according to one or more embodiments.
Figure 5B:
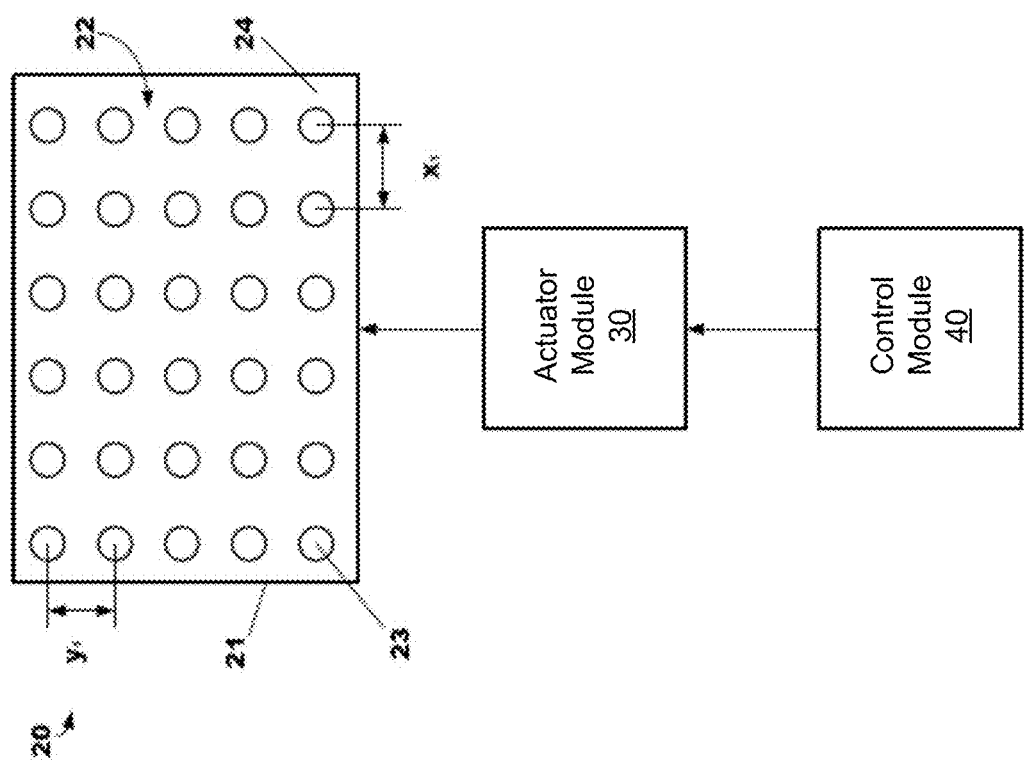

In some embodiments, a relatively loose fitting enclosure (FIG. 4E, already discussed) may be appropriate for a mirror assembly (such as, e.g., a rear view mirror). In some embodiments, a fitted relatively enclosure (FIG. 4F, already discussed) may be appropriate for a window assembly (such as, e.g., a front windshield). In some embodiments, the flanges (FIG. 4D, already discussed) may be attached to a window, mirror or display using an adhesive, a sealant, or other physical mounting (such as, e.g., screws). Similarly, the enclosures (FIGS. 4E-4F, already discussed) may be attached to a window, mirror or display using an adhesive, a sealant, or other physical mounting (such as, e.g., screws). Where used, the screws may, e.g., be mounted to holes in the glass. FIGS. 5A-5B provide diagrams illustrating an example of a tunable optical metamaterial 20 for use in a tunable window system (such as, e.g., tunable window system 200 in FIG. 2, already discussed) according to one or more embodiments, with reference to components and features described herein including but not limited to the figures and associated description. The tunable optical metamaterial 20 may comprise an electroactive substrate 21, i.e. a substrate having one or more electroactive surfaces 24, and an optically active particle array 22 comprising a plurality of optically active structures in the form of elongated members 23 that are populated on the electroactive surface in a spaced-apart configuration. As shown in the illustrated example, the one or more electroactive surfaces 24 upon which the optically active particle array 22 is arranged is substantially planar. The substrate 21 may be composed of a deformable and electroactive material such as, for example, a transparent electroactive polymer (EAP). Examples of a transparent EAP may include, for example, Solvene® 200.

An actuator module 30 may selectively activate the tunable optical metamaterial 20. The substrate 21 may have one or more electrical conductor members or electrodes arranged thereon or therein to establish one or more electrical interfaces between the substrate 21 and the actuator module 30. The actuator module 30 may comprise one or more electrical conductor members or electrodes electrically coupled to the corresponding one or more electrical conductors or electrodes at the electrical interface(s) with the substrate 21. Such electrical interfaces may be configured to facilitate electrical activation or stimulation of the substrate 21 by application of a voltage (e.g., a predetermined voltage) by the actuator module 30. The substrate 21 is configured to expand and contract in one or more directions (e.g., an x direction, a y-direction, or a combination thereof) upon the application of the voltage. In some embodiments, the actuator module 30 may selectively activate some (i.e., a portion) of the electrical conductors or electrodes at the electrical interface(s) with the substrate 21. The portion of the electrical conductors or electrodes at the electrical interface(s) with the substrate 21 may correspond to a particular location or area of the tunable optical metamaterial such that the effects of applying voltage to the substrate may be localized. For example, various regions of the display may have electrodes that can individually accessed, forming a matrix of addressable (i.e., controllable) regions where voltage(s) may be applied to effect a desired change in any individual region or in multiple regions on a region-by-region basis.

In one or more embodiments, each of the optically active elongated members 23 may comprise a metasurface that is configured to allow for phase control over light on the nanoscale. In one or more embodiments, the metasurface may be formed from a cylinder. In one or more embodiments, the metasurface may be formed from high refractive index materials, such as, for example, $TiO_2$, $HfO_2$, silicon, and AlN. The material composition of the metasurface may influence phase control. In accordance with one or more embodiments, the metasurface may comprise one or more metal resonator nanoparticles. Alternatively or additionally, the metasurface may comprise one or more inorganic resonator particles. Alternatively or additionally, the metasurface may comprise one or more organic resonator particles (e.g., such as PDTT:PSS).

The optically active elongated members 23 may be populated spaced apart on the electroactive surface in two or more orientations that are optically responsive to expansion and contraction by the substrate between a first state (such as, e.g., an inactive state) and a second state (such as, e.g., an active state). Alternatively or additionally, the optically active elongated members may be arranged in a repeating, lattice array. In one or more embodiments, the optically active elongated members may be spaced apart on the electroactive surface in two or more orientations to form confocal lenses.

As illustrated in FIG. 5A, the tunable optical metamaterial 20 is shown in a first state, which may be an inactive state (such as, e.g., a very low or zero voltage is applied by the actuator module 30) or a state in which a first voltage is applied by the actuator module 30. The optically active elongated members 23 may be populated on the electroactive surface 24 in a symmetric orientation in a manner such that each unit cell is spaced a lateral distance $x_1$ in the x-direction along the planar surface from a neighboring unit cell and vertical lateral distance $y_1$ in the y-direction along the planar surface from a neighboring unit cell. Alternatively, the optically active elongated members 23 may be populated on the electroactive surface in an asymmetric orientation.

As illustrated in FIG. 5B, the tunable optical metamaterial 20 is shown in a second state, which may be an active state and/or a state in which a second voltage is applied by the actuator module 30. The second voltage may be selectively applied to the substrate 21 having a symmetrical arrangement of optically active elongated members 23 thereon that causes an increase in the lateral distance (e.g., from $x_1$ to $x_2$) and the vertical distance (e.g., $y_1$ to $y_2$) between adjacent or neighboring optically active elongated members 23. When the electroactive substrate 21 is stretched or expanded, spacing between optically active elongated members 23 in the optically active particle array 22 increases, thereby increasing the period of the optically active particle array 22. By increasing the period of the optically active particle array 22, resonance broadening also increases. This resonance shift illustrates a relationship between the period of the optically active particle array 22 and the optical properties of the tunable optical metamaterial 20. Indeed, the selective modification of the optically active particle array 22 may modify the wavelengths and intensity of light transmitted or reflected by the tunable optical metamaterial 20 (e.g., light that reflects or passes through the tunable optical metamaterial). Such selective modification may be obtained via one or more of: a selective application of a suitable voltage to the substrate 21, the shape and orientation of the polymer fibers of the electroactive surfaces 24, and the shape and orientation of particles of the optically active particle array 22.

A control module 40 may selectively control the actuator module 30 and, hence, the application of one or more voltages to selectively activate the tunable optical metamaterial 20. The control module 40 may comprise one or more processors, and may correspond to controller 210 (FIG. 2, already discussed) and/or to controller 300 (FIG. 3, already discussed). In one or more embodiments, the control module 40 may incorporate the actuator module 30.

The control module 40 may be configured to execute a set of instructions (which may be stored in one or more data stores) to selectively control the optical properties of the tunable optical metamaterial 20 in a manner that alters the spacing between two or more of the optically active elongated members 23, thereby inducing an optical response by the optically active particle array 22. In particular, the control module 40 may be configured to transmit one or more control signals to activate the actuator module 30, which in turn causes the actuator module 30 to selectively apply a suitable voltage to the substrate 21 in manner which changes (e.g., expands or contracts) the geometric configuration, size, or square area of the substrate 21 from a first state to a second state. For example, one or more control signals from the control module 40 may activate the actuator module 30 to cause the actuator module 30 to selectively apply a suitable voltage to the substrate 21 in manner which expands the geometric configuration, size, or square area of the substrate 21 from a first state (such as, e.g., an inactive state) to a second state (such as, e.g., an active state). For example, the control module 40 may execute a set of instructions to selectively cause the one or more electrical conductor members of the actuator module 30 to apply a predetermined voltage to the electroactive surface in a manner that electrically activates the substrate 21. Such electrical activation may induce expansion of the substrate 21 to an active state (such as illustrated in FIG. 5B). In one or more embodiments, such an active state may represent a maximum overall size of the substrate 21.

While the electrical activation of the substrate 21 is maintained, the control module 40 may transmit one or more control signals to the actuator module 30 to selectively cause electrical deactivation of the substrate 21 in a manner that induces another optical response by the optically active particle array 22. Such electrical deactivation may induce contraction of the substrate 21 to an inactive state (such as illustrated in FIG. 5A). Such an inactive state may represent a minimum overall size of the substrate 21.

While the electrical activation of the substrate 21 is maintained, the control module 40 may transmit one or more control signals to the actuator module 30 to selectively cause a reduction in the electrical activation (e.g., by reducing the applied voltage) of the substrate 21 in a manner that induces another optical response by the optically active particle array 22. Such reduction in electrical activation may induce expansion or contraction of the substrate 21 to a third (i.e., active) state. Such a third state may represent an overall size of the substrate 21 that is between the maximum overall size and the minimum overall size.

The application of a predetermined voltage to the electroactive surface 24 of the substrate 21 induces bidirectional or unidirectional expansion of the substrate 21 in a manner that causes an optical response by the optically active particle array 22. The bidirectional or unidirectional expansion of the substrate 21 may be dependent upon an orientation of the substrate fibers (e.g., polymer fibers of an EAP). The application of a suitable voltage may cause a shift in the optical properties of the optically active particle array 22, such as absorption and emission spectra.

Figure 6A:
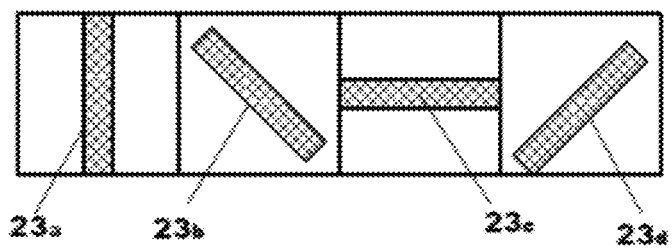
FIGS. 6A-6C provide diagrams illustrating examples of optically active structures of an optically active particle array according to one or more embodiments.
Figure 6B:
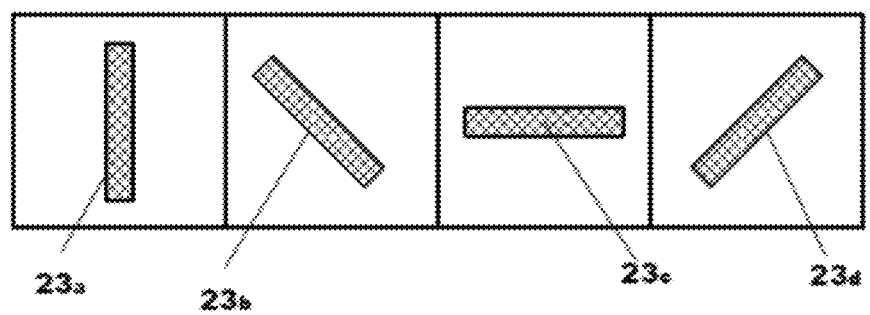
Figure 6C:
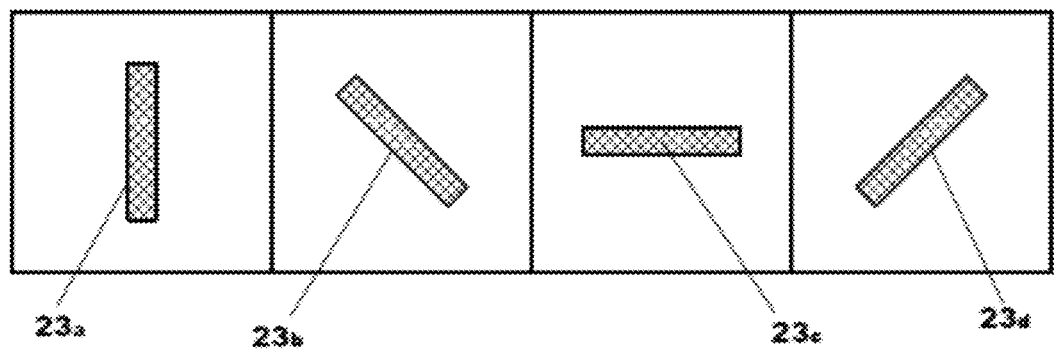

FIGS. 6A-6C provide diagrams illustrating examples of optically active structures of an optically active particle array according to one or more embodiments, with reference to components and features described herein including but not limited to the figures and associated description. The optically active particle array may correspond to the optically active particle array 22 (FIGS. 5A-5B, already discussed). Shown in each of FIGS. 6A-6C are optically active elongated members 23a, 23b, 23c, 23d, each illustrated as having different orientations such that, when subjected to bidirectional or unidirectional expansion and/or contraction of the substrate 21, causes an optical response that changes the nature of light that may be transmitted, reflected and/or absorbed by the optically active particle array. In particular, the distance between the optically active elongated members 23a, 23b, 23c, 23d will increase during expansion of the substrate. Likewise, the distance between the optically active elongated members 23a, 23b, 23c, 23d will decrease during contraction of the substrate. The amount of expansion or contraction may generally be in response to the applied voltage received by the substrate 21.

For example, the optically active elongated members 23a, 23b, 23c, 23d shown in FIG. 6A may reflect a first state (e.g., an inactive state) when a first voltage (which may be, e.g., a zero voltage or low voltage) is applied to the substrate. As another example, the optically active elongated members 23a, 23b, 23c, 23d shown in FIG. 6B may reflect a second state when a second voltage is applied to the substrate, such that the substrate has expanded in comparison to the substrate as shown for the first state in FIG. 6A. As another example, the optically active elongated members 23a, 23b, 23c, 23d shown in FIG. 6C may reflect a third state when a third voltage is applied to the substrate, such that the substrate has expanded yet again in comparison to the substrate as shown for the second state in FIG. 6B. Similarly, FIG. 6B may also show the optically active elongated members in a second state in which the substrate has contracted in comparison to the substrate as shown for the third state in FIG. 6C.

It should be noted that, while FIGS. 6A-6C illustrate optically active elongated members having four different orientations, in some embodiments the optically active elongated members may have fewer than four, or more than four, orientations. In some embodiments, the optically active elongated members may have at least two orientations.

It should further be noted that, while FIGS. 6A-6C illustrate optically active elongated members in a state of relative expansion or contraction in a first direction (e.g., an x-direction), in some embodiments the optically active elongated members may be in a state of relative expansion or contraction in a second direction (e.g., a y-direction). Further, in some embodiments the optically active elongated members may be in a state of relative expansion or contraction bidirectionally (e.g., two directions such as an x-direction and a y-direction), such as via a bidirectional expansion or contraction of the substrate in two directions as illustrated in FIGS. 5A-5B (already discussed).

In one or more embodiments, bidirectional or unidirectional expansion and/or contraction of the substrate 21 may cause a variation of the focal length of the confocal lenses. Thus, the relative expansion or contraction of the optically active elongated members 23a-23d as shown in FIGS. 6A-6C illustrates examples of changes in focal length of optically active structures of an optically active particle array.

In some embodiments the tunable optical metamaterials may include fluid-filled packets providing additional shape changing capabilities for expanded tuning functionality. Further details regarding tunable optical metamaterials are provided in U.S. patent application Ser. No. 17/227,687 entitled "Tunable Optical Metamaterial Having Electroactive Polymer Metasurfaces," and in U.S. patent application Ser. No. 17/227,794 entitled "Fluid Filled Active Metasurface," each filed of even date herewith, each application of which is incorporated herein by reference in its entirety as if set forth herein.

Vehicle Applications

The tunable window system 200 (FIG. 2, already discussed) may be applied in a subject vehicle to address visibility conditions caused, e.g., by ambient lighting conditions. Visibility conditions may be affected by, e.g., lighting conditions based on time of day/date, other nearby vehicles or structures, weather, etc. Signals from one or more photosensors (e.g., the photosensors $230_i$ in FIG. 2, already discussed) may provide input to the controller (e.g., the controller 210 in FIG. 2, already discussed) to assist in detection of visibility conditions. Input data from one or more other sources (such as, e.g., geolocation data, weather data, date data, time of day data, etc.) may also provide input to the controller to assist in detection of visibility conditions. Based on the detected visibility conditions, the controller may determine a change in a view to be provided by the window assembly to compensate or correct the view. Based on such determination, the controller may apply a voltage to the tunable optical metamaterials (e.g., applied to an electroactive substrate) sufficient to cause the substrate to expand or contract in a manner to change a spacing between optically active elongated members and, thus, adjust the view according to the determined change in the view.

As one example, the controller may determine that the ambient lighting conditions correspond to late-day darkness (such as, e.g., dusk or nightfall), such that a change to emphasize redder portions of the incoming light spectrum (or red-shift incoming light) would provide an appropriate correction in view. As another example, the controller may determine that the ambient lighting conditions are corresponding to blue mid-day light and, thus, that no correction or change in view is needed at that time. Further examples of changes in view may include one or more of (a) reduce intensity/brightness (or amount) of lighting visible through the window assembly, (b) shift (e.g., red-shift) in lighting, (c) block, reflect or absorb light at a particular angle of incidence, (d) block, reflect or absorb light at a particular polarization, or (e) scattering of light. Further, changes in view may be localized by applying voltages (or voltage change) to effect local expansion (i.e., stretching) or contraction (i.e., reduction) of the tunable optical metamaterial, such that the window locations most affected by the visibility conditions can be adjusted.

As one example, the amount of light visible through the window assembly can be reduced by tuning the metamaterial such that it is resonant with the light of the glare. The glare of the light may be identified by a photosensor (e.g., a photosensor $230_i$ as shown in FIG. 2, already discussed). In addition, the controller may cause the metamaterial to adjust to a certain dimension (stretched or reduced, based on the voltage applied to the substrate) to handle the wavelength(s) of light causing glare. The specific dimension of the metamaterial (as stretched or reduced) will correspond to a metamaterial unit cell that reflects or absorbs light at the desired wavelength. In some examples, the metamaterial may be stretched or reduced such that the visible light transmits through the window assembly at 100 percent (or near 100 percent). In some examples, transmissibility of 100 percent (or near 100 percent) may occur in an inactive state (i.e., when no voltage is applied to the substrate). In some examples, the metamaterial may be stretched or reduced such that the visible light transmits through the window assembly at a reduced percentage (such as, e.g., seventy-five percent, fifty percent, etc.).

As another example, the metamaterial can be designed to block light a particular angle. Light incident at the resonant angle would then be absorbed or reflected. By stretching or reducing the material (based on the applied voltage), the angle of incidence that will be absorbed or reflected can be broadened or made narrower.

As yet another example, the metamaterial may be used to block or absorb incident light of a particular polarization. For example, the metamaterial in an unstretched state may allow light to pass through with no blocking effect on light of a specific polarization and wavelength in the visible regime. When a unit cell of the metamaterial is stretched (such as, for example, based on the applied voltage in a particular design) the metamaterial may then experience a resonant absorption/reflection within a wavelength of interest for a given polarization of the incident light. As an example, the metamaterial may be stretched by 10 nm to obtain a resonant absorption/reflection within a wavelength of interest.

Similar effects in reflection or absorption of light from a mirror assembly or a display assembly may be obtained through application of a particular voltage to the metamaterial to cause changes (e.g., in a unit cell) to absorb or reflect light and obtain a desired correction in visibility.

FIGS. 7(a)-7(e) provide a set of images depicting examples of visibility conditions to which a tunable window system may be applied according to one or more embodiments, with reference to components and features described herein including but not limited to the figures and associated description. The tunable window system 200 may be applied in a subject vehicle to address visibility conditions caused, e.g., by conditions as described each of the following examples.

Example: Vehicle Headlight Glare

Figure 7A:
FIGS. 7(a)-7(e) provide a set of images depicting examples of visibility conditions to which a tunable window system may be applied according to one or more embodiments.

The image in FIG. 7(a) illustrates an example of headlight glare (i.e., glare or bloom in lighting) that may be viewed in a subject vehicle as caused by the headlights of another vehicle in the vicinity. Headlight glare may be viewed, for example, through a front window of the subject vehicle, such as when an oncoming vehicle (e.g., in an adjacent lane) is approaching the subject vehicle. Headlight glare may additionally (or alternatively) be viewed, for example, through a rear window of the subject vehicle, or in a mirror of the subject vehicle (e.g., a rear view mirror or a side mirror), such as when another vehicle is behind the subject vehicle (e.g., in the same lane or an adjacent lane). The headlight glare may be detected via, e.g., signals from one or more photosensors (e.g., photosensors $230_i$ in FIG. 2, already discussed). Upon detection of headlight glare, the controller (e.g., controller 210 in FIG. 2, already discussed) may determine a change in a view to be provided by the window assembly or the mirror assembly to compensate or correct the view to reduce or eliminate the glare. Based on such determination, the controller may apply a voltage to the substrate to cause the substrate to expand or contract in a manner sufficient to adjust the view for the window assembly according to the determined view change.

For example, the controller may cause adjustment such that the total amount of light is to be reduced, or the light can be blocked at a specific set of wavelengths in order to reduce the glare. As described above, the metamaterial can be designed to have specific optical parameters for absorption/reflection of light at a given wavelength. As a result, the adjustment may then either change the color of the visible light passing through the window assembly, if the controller targeted only certain of the wavelengths, or it may generally reduce the light by a given proportion.

As another example, the controller may cause adjustment such that light at a particular angle may be reduced, but light in line with the viewer may be received. Depending upon the specific nature and design of the metamaterial, differing angles of light (within a range subject to design) may be transmitted or absorbed/reflected. When the metamaterial is stretched the transmission angle may be increased for a given frequency.

As yet another example, adjustment may be made for polarization of the light from the headlights. Depending on the type of headlamp, the incident light may be polarized or unpolarized. As described above, the metamaterial can be designed such that, with a given level of stretching or reduction (or no stretching/reduction), light is reflected or absorbed when a specific polarization is incident on the structure. The metamaterial can also be stretched or reduced in a manner so that the polarization no longer impacts the absorption/reflection of the metamaterial.

As described above, adjustments may be made on a region-by-region basis by applying voltages (under the control of the controller) the controller to certain one or more regions of the window assembly, rather than to an entire window assembly.

Example: Man-Made Structures

Figure 7B:

The image in FIG. 7(b) illustrates an example of glare or an abrupt change in lighting that may be viewed in a subject vehicle as caused by the vehicle passing by (or through) a man-made structure, such as a tunnel (as shown in the image). The glare or abrupt lighting change may be viewed, for example, through a front window of the subject vehicle. The glare or abrupt lighting change may be detected or predicted via, e.g., geolocation data that identifies when the subject vehicle is about to pass by or though a structure, and may indicate whether the vehicle is about to enter or exit the structure. Such structures may include a tunnel, a parking garage, a large building, etc. As one example, the geolocation data may identify a tunnel that the vehicle is about to enter. Upon identification of the nearby structure, the controller (e.g., controller 210 in FIG. 2, already discussed) may determine a change in a view to be provided by the window assembly to compensate or correct the view to reduce or eliminate the glare or other visibility problem caused by the structure. Signals received from one or more photosensors (e.g., photosensors $230_i$ in FIG. 2, already discussed) may provide further input to the controller to assist in the change of view determination. Based on such determination, the controller may apply a voltage to the substrate to cause the substrate to expand or contract in a manner sufficient to adjust the view for the window assembly according to the determined view change.

For example, as described above adjustments may be made by the controller to cause modifications to the intensity (e.g., brightness) of light visible through the window assembly, or to block light at a particular angle or polarization. Additionally, as described above adjustments may be made to the metamaterial of a given window assembly on a region-by-region basis, such that the window locations most affected by the visibility conditions created by the structure can be adjusted based on the applied voltage.

Example: Sunrise and Sunset

Figure 7C:

The image in FIG. 7(c) illustrates an example of glare that may be viewed in a subject vehicle as caused by the sunlight when the sun is at a low angle near the horizon, at or near sunrise or sunset. The glare may be viewed, for example, through a front window, or side windows, or a rear window, and/or in mirrors of the subject vehicle. The glare may be detected or predicted via time of day and date data which identifies when the vehicle is encountering driving conditions at or near sunrise or sunset. In addition, geolocation data or other data providing information regarding vehicle orientation may provide additional input as to the expected direction of the sunlight. Upon identification of a sunrise or sunset condition, the controller (e.g., controller 210 in FIG. 2, already discussed) may determine a change in a view to be provided by one or more window assemblies and/or one or more mirror assemblies to compensate or correct the view to reduce or eliminate the glare. Signals received from one or more photosensors (e.g., photosensors $230_i$ in FIG. 2, already discussed) may provide further input to the controller to assist in the change of view determination. Based on such determination, the controller may apply a voltage to the substrate to cause the substrate to expand or contract in a manner sufficient to adjust the view for the window assembly according to the determined view change.

For example, in the case of low angle sunlight, the overall amount of light may be reduced as described above. Moreover, low angle sunlight may be highly polarized. Accordingly, as another example, a metamaterial having a high polarization resonance may be used to mitigate the high intensity of low angle sunlight, which would, in turn, allow for light at other angles to reach the driver. In this scenario, if the driver were to turn on the vehicle headlights, the reflected light would likely be non-polarized and thus pass back through the window assembly. As another example, light incident at a low angle may be blocked, although this solution may not be as effective as blocking polarized light. Furthermore, as described above the adjustment(s) may be applied to one or more local regions of the window assembly.

Example: Reduced Visibility Due to Ambient Conditions

Figure 7D:

The image in FIG. 7(d) illustrates an example of reduced visibility that may be viewed in a subject vehicle as caused by ambient conditions, such as weather (e.g., cloudiness, storm, etc.) or other local conditions (e.g., solar eclipse). The reduced visibility may impact the view, for example, through a front window, or side windows, or a rear window, and/or in mirrors of the subject vehicle. The ambient conditions (e.g., weather) may be detected based on incoming data (e.g. weather data) which identifies when the vehicle is encountering driving conditions resulting in reduced visibility. In addition, geolocation data or other data providing information regarding vehicle orientation may provide additional input as to the vehicle location in relation to ambient conditions. Upon identification of an ambient condition resulting in reduced visibility, the controller (e.g., controller 210 in FIG. 2, already discussed) may determine a change in a view to be provided by one or more window assemblies and/or one or more mirror assemblies to compensate or correct the view to reduce or eliminate the glare. Signals received from one or more photosensors (e.g., photosensors $230_i$ in FIG. 2, already discussed) may provide further input to the controller to assist in the change of view determination. Based on such determination, the controller may apply a voltage to the substrate to cause the substrate to expand or contract in a manner sufficient to adjust the view for the window assembly according to the determined view change.

As described above, adjustments may include one or more of modifying the amount of light passing through the window assembly, red-shifting or blue-shifting the incoming light, blocking light at a particular wavelength, angle, or polarization, etc. Additionally, as described above the adjustment(s) may be applied to one or more local regions of the window assembly.

Example: Vehicle Display

Figure 7E:

The image in FIG. 7(e) illustrates an example of variation in visibility of an in-vehicle display. The image illustrates a series of display renderings at five different levels of visibility, ranging from dark (leftmost rendering) to bright (rightmost rendering). The apparent visibility of the display may be affected by, e.g., ambient visibility conditions based on time of day, ambient light conditions, and/or any one or more of the conditions described in the previous examples. Signals from one or more photosensors (e.g., the photosensors $230_i$ in FIG. 2, already discussed) may provide input to the controller (e.g., the controller 210 in FIG. 2, already discussed) to assist in detection of visibility conditions at the display. Input data from one or more other sources (such as, e.g., geolocation data, weather data, date data, time of day data, etc.) may also provide input to the controller to assist in detection of visibility conditions. Based on the detected visibility conditions, the controller may determine a change in a view to be provided by the display assembly to compensate or correct the view. Based on such determination, the controller may apply a voltage to the substrate to cause the substrate to expand or contract in a manner sufficient to adjust the view for the window assembly according to the determined view change.

Figure 8:
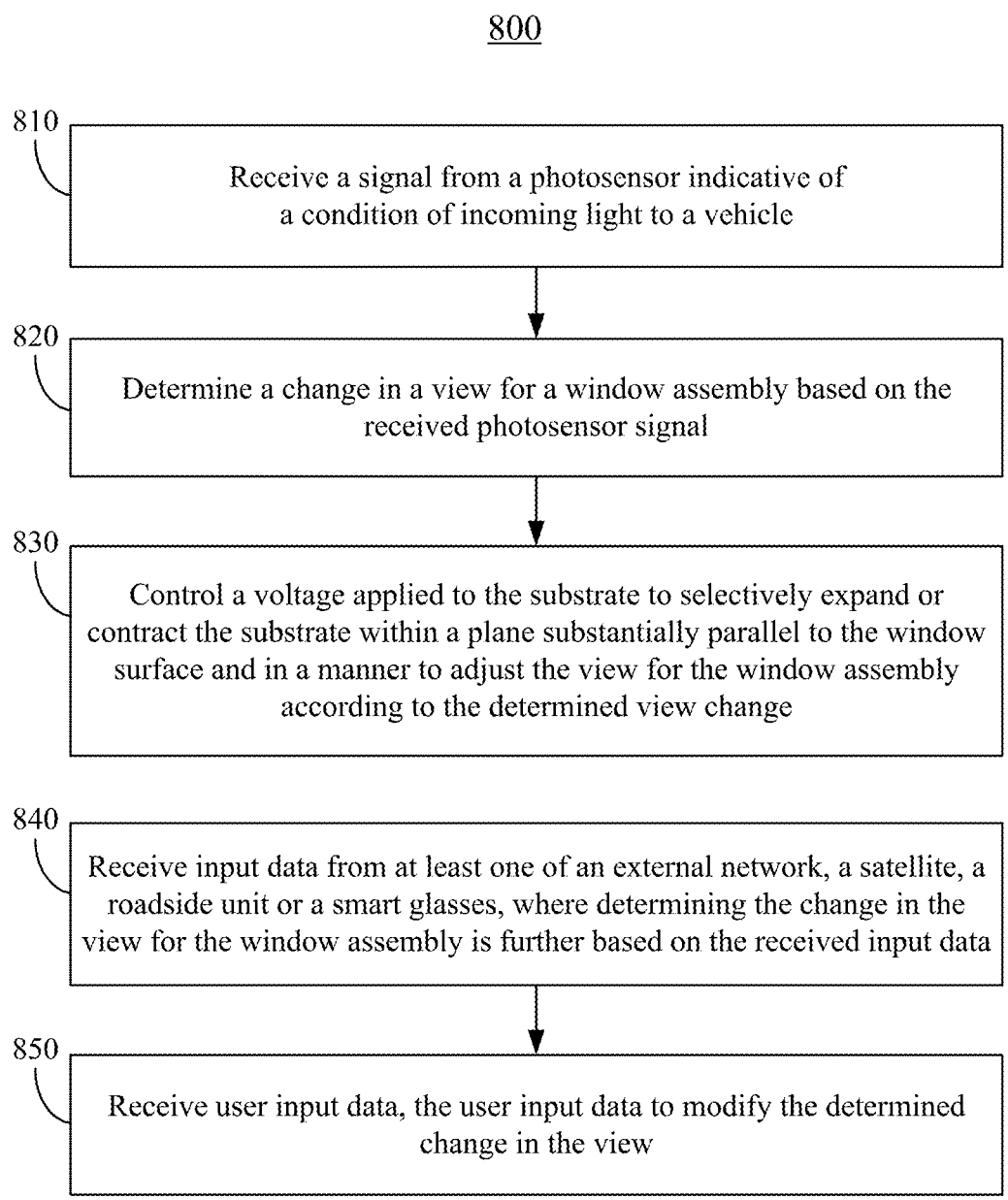
FIG. 8 is a flowchart illustrating a method of operating a tunable window system according to one or more embodiments.

FIG. 8 provides a flowchart illustrating a method 800 of operating a tunable window system (e.g., system 200 in FIG. 2, already discussed) according to one or more embodiments, with reference to components and features described herein including but not limited to the figures and associated description. The method 800 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, the method 800 may be carried out by controller 210 (FIG. 2, already discussed), controller 300 (FIG. 3, already discussed), and/or control module 40 (FIGS. 5A-5B, already discussed).

For example, computer program code to carry out operations shown in the method 800 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

At processing block 810, the system may receive a signal from a photosensor indicative of a condition of incoming light to a vehicle. At processing block 820, the system may determine a change in a view for a window assembly based on the received photosensor signal. The window assembly may comprise a tunable optical metamaterial deployed on a surface of a window, the tunable optical metamaterial including a transparent electroactive substrate having disposed thereon an optically active particle array, the optically active particle array including resonators having elongated members arranged in two or more orientations. At processing block 830, the system may control a voltage applied to the substrate to selectively expand or contract the substrate within a plane substantially parallel to the window surface and in a manner to adjust the view for the window assembly according to the determined view change. The optically active particle array may be optically responsive to the selective expansion or contraction of the substrate.

In one or more embodiments, the determined change in view may be a change in intensity (e.g., brightness) of the incoming light, and the voltage applied to the substrate may cause the substrate to expand or contract in a manner to alter a spacing between the elongated members sufficient to reduce or increase the intensity (e.g., brightness) of the incoming light in at least a portion of the window assembly.

In one or more embodiments, at processing block 840, the system may receive input data from at least one of an external network, a satellite, a roadside unit or a smart glass, where determining the change in the view for the window assembly is further based on the received input data. In one or more embodiments, the input data may include at least one of geolocation data, weather data, date data or local time of day data.

In one or more embodiments, the voltage applied to the substrate may cause the substrate to expand or contract in a manner to alter a spacing between the elongated members sufficient to absorb or reflect a portion of the incoming light incident at a particular angle or to absorb or reflect a portion of the incoming light having a particular polarization.

In one or more embodiments, at processing block 850, the system may receive user input data, the user input data to modify the determined change in the view.

The above described methods and systems may be readily combined together if desired. The term "coupled" may be used herein to refer to any type of relationship, direct or indirect, between the components in question, and may apply to electrical, mechanical, fluid, optical, electromagnetic, electromechanical, or other connections, including logical connections via intermediate components (e.g., device A may be coupled to device C via device B). In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present disclosure can be implemented in a variety of forms. Therefore, while the embodiments of this disclosure have been described in connection with particular examples thereof, the true scope of the embodiments of the disclosure should not be so limited since other modifications will become apparent to the skilled practitioner upon a study of the drawings, specification, and following claims.

We claim:

1. A tunable window system for a vehicle comprising:
   a window assembly comprising a tunable optical metamaterial deployed on a surface of a window, the tunable optical metamaterial including a transparent electroactive substrate having disposed thereon an optically active particle array, the optically active particle array including resonators having elongated members arranged in two or more orientations;
   a photosensor; and
   a controller, the controller configured to:
      receive a signal from the photosensor indicative of a condition of incoming light to the vehicle;
      determine a change in a view for the window assembly based on the received photosensor signal; and
      control a voltage applied to the substrate to selectively expand or contract the substrate within a plane substantially parallel to the window surface and in a manner to adjust the view for the window assembly according to the determined view change, wherein the optically active particle array is optically responsive to the selective expansion or contraction of the substrate.

2. The system of claim 1, wherein the substrate comprises an electroactive polymer.

3. The system of claim 2, wherein the determined change in view is a change in intensity of the incoming light, and wherein the voltage applied to the substrate is to cause the substrate to expand or contract in a manner to alter a spacing between the elongated members sufficient to reduce or increase the intensity of the incoming light in at least a portion of the window assembly.

4. The system of claim 2, wherein the controller is further configured to receive input data from at least one of an external network, a satellite, a roadside unit or a smart glasses, and wherein to determine the change in the view for the window assembly is further based on the received input data.

5. The system of claim 4, wherein the input data comprises at least one of geolocation data, weather data, date data or local time of day data.

6. The system of claim 5, wherein the voltage applied to the substrate is to cause the substrate to expand or contract in a manner to alter a spacing between the elongated members sufficient to absorb or reflect a portion of the incoming light incident at a particular angle or to absorb or reflect a portion of the incoming light having a particular polarization.

7. The system of claim 4, wherein the controller is further configured to receive user input data, the user input data to modify the determined change in the view.

8. The system of claim 1, further comprising:
   a mirror assembly comprising a second tunable optical metamaterial deployed on a surface of a mirror, the second tunable optical metamaterial including a second transparent electroactive substrate having disposed thereon a second optically active particle array, the second optically active particle array including resonators having elongated members arranged in two or more orientations; and
   a second photosensor;
   wherein the controller is further configured to:

receive a signal from the second photosensor indicative of a condition of incoming light to the vehicle;

determine a second change in a view for the mirror assembly based on the received second photosensor signal; and control a voltage applied to the substrate to selectively expand or contract the second substrate in a manner to adjust the view for the mirror assembly according to the determined second view change, wherein the second optically active particle array is optically responsive to the selective expansion or contraction of the second substrate.

9. At least one non-transitory computer readable storage medium comprising a set of instructions which, when executed by a processor, cause the processor to:

receive a signal from a photosensor indicative of a condition of incoming light to a vehicle;

determine a change in a view for a window assembly based on the received photosensor signal,
wherein the window assembly comprises a tunable optical metamaterial deployed on a surface of a window, the tunable optical metamaterial including a transparent electroactive substrate having disposed thereon an optically active particle array, the optically active particle array including resonators having elongated members arranged in two or more orientations; and control a voltage applied to the substrate to selectively expand or contract the substrate within a plane substantially parallel to the window surface and in a manner to adjust the view for the window assembly according to the determined view change, wherein the optically active particle array is optically responsive to the selective expansion or contraction of the substrate.

10. The at least one non-transitory computer readable storage medium of claim 9, wherein the determined change in view is a change in intensity of the incoming light, and wherein the voltage applied to the substrate causes the substrate to expand or contract in a manner to alter a spacing between the elongated members sufficient to reduce or increase the intensity of the incoming light in at least a portion of the window assembly.

11. The at least one non-transitory computer readable storage medium of claim 9, wherein the instructions, when executed, further cause the processor to receive input data from at least one of an external network, a satellite, a roadside unit or a smart glasses, and wherein to determine the change in the view for the window assembly is further based on the received input data.

12. The at least one non-transitory computer readable storage medium of claim 11, wherein the input data comprises at least one of geolocation data, weather data, date data or local time of day data.

13. The at least one non-transitory computer readable storage medium of claim 12, wherein the voltage applied to the substrate causes the substrate to expand or contract in a manner to alter a spacing between the elongated members sufficient to absorb or reflect a portion of the incoming light incident at a particular angle or to absorb or reflect a portion of the incoming light having a particular polarization.

14. The at least one non-transitory computer readable storage medium of claim 11, wherein the instructions, when executed, further cause the processor to receive user input data, the user input data to modify the determined change in the view.

15. A method comprising:

receiving a signal from a photosensor indicative of a condition of incoming light to a vehicle;

determining a change in a view for a window assembly based on the received photosensor signal,
wherein the window assembly comprises a tunable optical metamaterial deployed on a surface of a window, the tunable optical metamaterial including a transparent electroactive substrate having disposed thereon an optically active particle array, the optically active particle array including resonators having elongated members arranged in two or more orientations; and controlling a voltage applied to the substrate to selectively expand or contract the substrate within a plane substantially parallel to the window surface and in a manner to adjust the view for the window assembly according to the determined view change, wherein the optically active particle array is optically responsive to the selective expansion or contraction of the substrate.

16. The method of claim 15, wherein the determined change in view is a change in intensity of the incoming light, and wherein the voltage applied to the substrate causes the substrate to expand or contract in a manner to alter a spacing between the elongated members sufficient to reduce or increase the intensity of the incoming light in at least a portion of the window assembly.

17. The method of claim 15, further comprising receiving input data from at least one of an external network, a satellite, a roadside unit or a smart glasses, and wherein determining the change in the view for the window assembly is further based on the received input data.

18. The method of claim 17, wherein the input data comprises at least one of geolocation data, weather data, date data or local time of day data.

19. The method of claim 18, wherein the voltage applied to the substrate causes the substrate to expand or contract in a manner to alter a spacing between the elongated members sufficient to absorb or reflect a portion of the incoming light incident at a particular angle or to absorb or reflect a portion of the incoming light having a particular polarization.

20. The method of claim 17, further comprising receiving user input data, the user input data to modify the determined change in the view.

\* \* \* \* \*